(12) United States Patent
Nawa et al.

(10) Patent No.: US 11,373,036 B2
(45) Date of Patent: Jun. 28, 2022

(54) CONTROL DEVICE, CONTROL METHOD AND CONTROL PROGRAM

(71) Applicant: Nippon Telegraph and Telephone Corporation, Tokyo (JP)

(72) Inventors: Nagatoshi Nawa, Tokyo (JP); Akira Inoue, Tokyo (JP); Koichi Yamada, Tokyo (JP); Ikuko Takagi, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 71 days.

(21) Appl. No.: 16/979,559

(22) PCT Filed: Mar. 14, 2019

(86) PCT No.: PCT/JP2019/010713
§ 371 (c)(1),
(2) Date: Sep. 10, 2020

(87) PCT Pub. No.: WO2019/177129
PCT Pub. Date: Sep. 19, 2019

(65) Prior Publication Data
US 2021/0004531 A1  Jan. 7, 2021

(30) Foreign Application Priority Data
Mar. 14, 2018 (JP) .............................. JP2018-046412

(51) Int. Cl.
*G06F 40/18* (2020.01)
*G06F 9/48* (2006.01)
*G06F 9/54* (2006.01)

(52) U.S. Cl.
CPC ................ *G06F 40/18* (2020.01); *G06F 9/48* (2013.01); *G06F 9/54* (2013.01)

(58) Field of Classification Search
CPC ...................................................... G06F 40/18
See application file for complete search history.

(56) References Cited

U.S. PATENT DOCUMENTS

2009/0210819 A1* 8/2009 Fugimoto et al. ....... G06F 3/048
2010/0100427 A1* 4/2010 McKeown et al. .... G06Q 10/00
2018/0246651 A1* 8/2018 Sakaguchi et al. ... G06F 3/0605

OTHER PUBLICATIONS

Access.redhat.com. [online]. "Chapter V Using the Spreadsheet Decision Table," available no later than Mar. 14, 2018, retrieved on Jan. 10, 2018, retrieved from URL<access.redhat.com/documentation/ja-JP/JBoss_Enterprise_SOA_Platform/5/html/JBoss_Rules_5_Reference_Guide/chap-authoring.html>, 33 pages (with English Translation).

(Continued)

*Primary Examiner* — James J Debrow
(74) *Attorney, Agent, or Firm* — Fish & Richardson P.C.

(57) ABSTRACT

A control device (10) includes a spreadsheet process additional starting-up unit (162) and a spreadsheet process holding unit (163) configured to newly start up the spreadsheet software when the spreadsheet software has not been started up, and when the spreadsheet software has been started up configured to start up second spreadsheet software when spreadsheet software having been started up has been held such that the spreadsheet software is not terminated, a data entry unit (168) configured to enter information acquired by accessing to an information acquisition source in an information entry portion of a calculation sheet of the spreadsheet software, the calculation sheet being a calculation sheet in which a business logic is set for inter-cell computation on the calculation sheet, and a result acquisition unit (169) configured to acquire a determination result on the calculation sheet when a determination result for the information entered in the information entry portion is shown by the business logic represented as inter-cell computation on the calculation sheet, and notifies a high-order system of the acquired determination result.

12 Claims, 10 Drawing Sheets

(56) References Cited

OTHER PUBLICATIONS

Ibm.com, [online], "Creating Dynamic Domains," 2018, retrieved on Aug. 5, 2020, retrieved from URL<https://www.ibm.com/support/knowledgecenter/en/SSQP76_8.10.x/com.ibm.odm.dserver.rules.designer.author/config_auth_topics/tsk_rd_bom_dynamic_domains.html>, 3 pages.

Ibm.com, [online], "IBM WebSphere ILOG JRules," 2018, retrieved on Aug. 4, 2020, retrieved from URL<https://www.ibm.com/support/knowledgecenter/ja/SSZJPZ_11.3.0/com.ibm.swg.im.iis.conn.jrules.use.doc/topics/ilog_jrules_container.html>, 5 pages (with English Translation).

* cited by examiner

| | | | INTER-ITEM ASSOCIATION SETTING TABLE [7.xlsm - XXX Excel | | | | |
|---|---|---|---|---|---|---|---|
| FILE | HOME INSERT PAGE LAYOUT EXPRESSION DATA REVISION DISPLAY DEVELOPMENT TEAM | | | | | | |
| | G54 | | | | | (5) THIS COLUMN IS AUTOMATICALLY FILLED (OVERWRITTEN) | XXXGXXX |
| | Range UPDATE | (3) TARGET COLUMN IS ESTIMATED FROM ITEM NAME | (1) PLEASE LIST UP ITEMS TO BE CHECKED | | | | |
| | Range | SHEET | ITEM NAME 1 | ITEM NAME 2 | ITEM NAME 3 | ITEM NAME 4 | ITEM NAME 5 | ITEM VALUE |
| 4 | G | | USER INFORMATION [ESSENTIAL] | EMPLOYEES/PARTNERS ID | | | | 1745304 |
| 5 | H | | | USER NAME | | | | NAGATOSHI NAWA |
| 6 | C | | | APPLICATION CLASSIFICATION | | | | REGISTER |
| 7 | D | | | FREE APPLICATION * 2 | | | | ADDITION OF NEW WORK |
| 8 | P | | | BBA PROCUREMENT WORK SUPPORT SYSTEM | | | | O |
| 9 | Q | | | DARK PROCUREMENT WORK SUPPORT SYSTEM | | | | O |
| 10 | R | | | BBA-ECU (BASIC SYSTEM) | | | | |
| 11 | S | | | BBA-ECU (EXTERNAL) | | | | |
| 12 | T | | | BBA-SO ANALYSIS MANAGEMENT SYSTEM (B-SAM) | | | | |
| 42 | AX | | | OCN DATA STATION | | | | |
| 43 | AY | | | ACCEL | | | | O |
| 44 | AZ | | | FOCUS | | | | |
| 45 | BA | | | BELUGA | | | | |
| 46 | BB | | | PIAS/CDCS | | | | |
| 47 | BC | | | NEW ACCOUNTING SYSTEM (N-ACTIVE) | | | | |
| 48 | BD | | | PROCUREMENT INTEGRATED SYSTEM | | | | |
| 49 | E | 1. BBA WORK SUPPORT | APPLICATION TYPE | /TOOL NAME | SUBJECT INFORMATION | PARTNER ID | | 1745304 |
| 50 | C | | REGISTRATION, CHANGE, DELETION | | | | | REGISTER |
| 51 | E | 2. BBA (OTHER); DARK IWF | APPLICATION TYPE | /TOOL NAME | WORK TYPE | SUBJECT INFORMATION | PARTNER ID | |
| 52 | C | | REGISTRATION, CHANGE, DELETION | | | | | |
| 53 | E | 3. ★VARIOUS TOOLS | APPLICATION TYPE | /TOOL NAME | WORK TYPE | SUBJECT INFORMATION | PARTNER ID | 1745304 |
| 54 | C | | REGISTRATION, CHANGE, DELETION | | | | | REGISTER |
| 55 | E | 4. ★VARIOUS TOOLS | APPLICATION TYPE | /TOOL NAME | WORK TYPE | SUBJECT INFORMATION | PARTNER ID | 1745304 |
| 56 | C | | REGISTRATION, CHANGE, DELETION | | | | | REGISTER |
| 57 | E | 5. MONITORING SYSTEM | APPLICATION TYPE | /TOOL NAME | WORK TYPE | SUBJECT INFORMATION | PARTNER ID | 1745304 |
| 58 | C | | REGISTRATION, CHANGE, DELETION | | | | | REGISTER |
| 59 | C | 6. PIAS CDCS Netscape | USER ID | | | | | NEW |
| 60 | B | | APPLICATION CLASSIFICATION | | | | | |
| 61 | F | 7. NEW ACCOUNTING SYSTEM | NAME | | | | | |
| 62 | B | 8. PROCUREMENT INTEGRATED SYSTEM | APPLICATION CLASSIFICATION | | | | | |
| 63 | D | | EMPLOYEE NUMBER/ALLIANCE CODE | | | | | |
| 64 | B | | TYPE | | | | | |

A–G COLUMN INDICATING INFORMATION ACQUISITION SOURCE

COLUMN IN WHICH ACQUIRED INFORMATION IS ENTERED

=IF(ISBLANK(H50),TRUE,H50=H7) — Pe

PARAMETER TABLE

| | Rule Table Discounts (T) | | | | |
|---|---|---|---|---|---|
| | CONDITION | CONDITION | CONDITION | CONDITION | ACTION |
| | Driver | | | policy: Policy | policy |
| | age >= $1, age <= $2 | priorClaims | | type | applyDiscount($param) |
| | Age Bracket | Number of prior claims | | Policy type applying for | Discount % |
| Promotional discount rules | 18,24 | 0 | | COMPREHENSIVE | 1 |
| | 18,24 | 0 | | FIRE_THEFT | 2 |
| Rewards for safe drivers | 25,30 | 1 | | COMPREHENSIVE | 5 |
| | 25,30 | 2 | | COMPREHENSIVE | 1 |
| | 25,30 | 0 | | COMPREHENSIVE | 20 |

(a)

DSL

```
[condition][]There is a customer ticket with status of "[status]":customer :
           Customer() ticket : Ticket( customer == customer, status == "[status]")
[condition][]There is a "[subscription]" customer with a ticket status of
           "[status]":customer : Customer(subscription == "[subscription]") ,
           ticket : Ticket( customer == customer, status == "[status]")
[consequence][]Log "[message]" =System.out.println("[message]");
[consequence][]Escalate the ticket=modify (ticket) {setStatus("Escalate")}
[consequence][]Send escalation email=sendEscalationEmail( customer, ticket );
```

CONTROL DEVICE, CONTROL METHOD AND CONTROL PROGRAM

CROSS-REFERENCE TO RELATED APPLICATIONS

This application is a National Stage application under 35 U.S.C. § 371 of International Application No. PCT/JP2019/010713, having an International Filing Date of Mar. 14, 2019, which claims priority to Japanese Application Serial No. 2018-046412, filed on Mar. 14, 2018. The disclosure of the prior application is considered part of the disclosure of this application, and is incorporated in its entirety into this application.

TECHNICAL FIELD

The present disclosure relates to a control device, a control method, and a control program.

BACKGROUND ART

Although there has been a demand for a work support system for improving the efficiency of work, the work to be processed changes quickly, and how to make a system conform to changes in work has been a problem for a long time.

Here, with regard to processing content, a specific conditions determination function required for each item of work content is referred to as a business rule, and various approaches have been made in the method of implementation thereof. For example, in an initial stage, a business rule has been described as a program. However, this method requires changes that affect the entire system for each change of rule.

Thus, a business rules management system (BRMS) that retrieves and manages only certain business rules has been developed. In a BRMS, a reduction in the number of development steps and a change in requirements are facilitated by separating a conditions determination function from a program body. Among these, specific parameters (a boundary value and the like) can be arranged as a table, so that portions that are changed frequently in performing work can be changed by non-experts.

Here, as a BRMS, there is a method using spreadsheet software made by a third party as a parameter supply source or a parameter setting editor. For example, as a parameter table of a business rule, there is a method which uses a document of spreadsheet software such as Excel (registered trademark). According to this method, there is an advantage in that a user can directly execute editing or a correction operation using a tool such as Excel which is familiar to the user.

CITATION LIST

Non Patent Literature

NPL 1: JBoss Rules, [online], [retrieved Feb. 27, 2018]; Internet <URL: https://access.redhat.com/documentation/ja-JP/JBoss_Enterprise_SOA_Platform/5/html/JBoss_Rules_5_Reference_Guide/chap-authoring.html NPL 2: Mounting sample having ILOG JRules dynamic domain function [online], [retrieved Feb. 27, 2018]; Internet <URL: https://www.ibm.com/developerworks/jp/websphere/library/ilog/brms_dyndomain_sample/>

NPL 3: IBM WebSphere ILOG JRules, [online], [retrieved Feb. 27, 2018]; Internet <URL: https://www.ibm.com/support/knowledgecenter/ja/SSZJPZ_11.3.0/com.ibm.swg.im.iis.conn.jrules.use.doc/topics/ilog_jrules_container.html>

SUMMARY OF THE INVENTION

Technical Problem

However, these methods only improve a method of imparting parameters to a condition determination engine provided by a BRMS, and specialized knowledge is required to set what meaning is given to these parameters, and the like. That is, specialized knowledge including development language is required for a portion describing logic, and it has been difficult for a general user to create a logic description portion or execute condition setting.

The present disclosure is contrived in view of the above description, and an object thereof is to, in a work support system, provide a control device, a control method, and a control program which allow a user to flexibly set conditions for portions describing logic.

Means for Solving the Problem

In order to solve the problems described above and achieve these objectives, the control device according to the present disclosure includes a spreadsheet confirming unit configured to confirm a start up of spreadsheet software; a spreadsheet process holding unit configured to newly start up the spreadsheet software, when the spreadsheet software has not been started up, and, when the spreadsheet software has been started up, configured to start up second spreadsheet software after holding the started up spreadsheet software such that the started up spreadsheet software is not terminated; an acquisition unit configured to access an information acquisition source to acquire information; an entry unit configured to enter the information acquired by the acquisition unit in an information entry portion of a calculation sheet of the spreadsheet software, the calculation sheet being a calculation sheet in which a business logic is set for inter-cell computation on the calculation sheet; and a result acquisition unit configured to acquire a determination result on the calculation sheet when a determination result for the information entered in the information entry portion is shown by the business logic represented as inter-cell computation on the calculation sheet, and notifies a high-order system of the acquired determination result.

Effects of the Invention

According to the present disclosure, a user can flexibly set conditions for portions describing logic in a work support system.

BRIEF DESCRIPTION OF DRAWINGS

FIG. 3 is a diagram illustrating an example of description in an Excel calculation sheet used in the control device illustrated in FIG. 1.

FIG. 9 is a set of diagrams illustrating data used at the time of rule calling and rule execution in JBoss Rules of the related art.

DESCRIPTION OF EMBODIMENTS

Hereinafter, an embodiment of the present invention will be described in detail with reference to drawings. Note that the present disclosure is not limited by the embodiment. Also, the same components in description of the drawings will be represented with the same reference signs.

Embodiment

Figure 1:
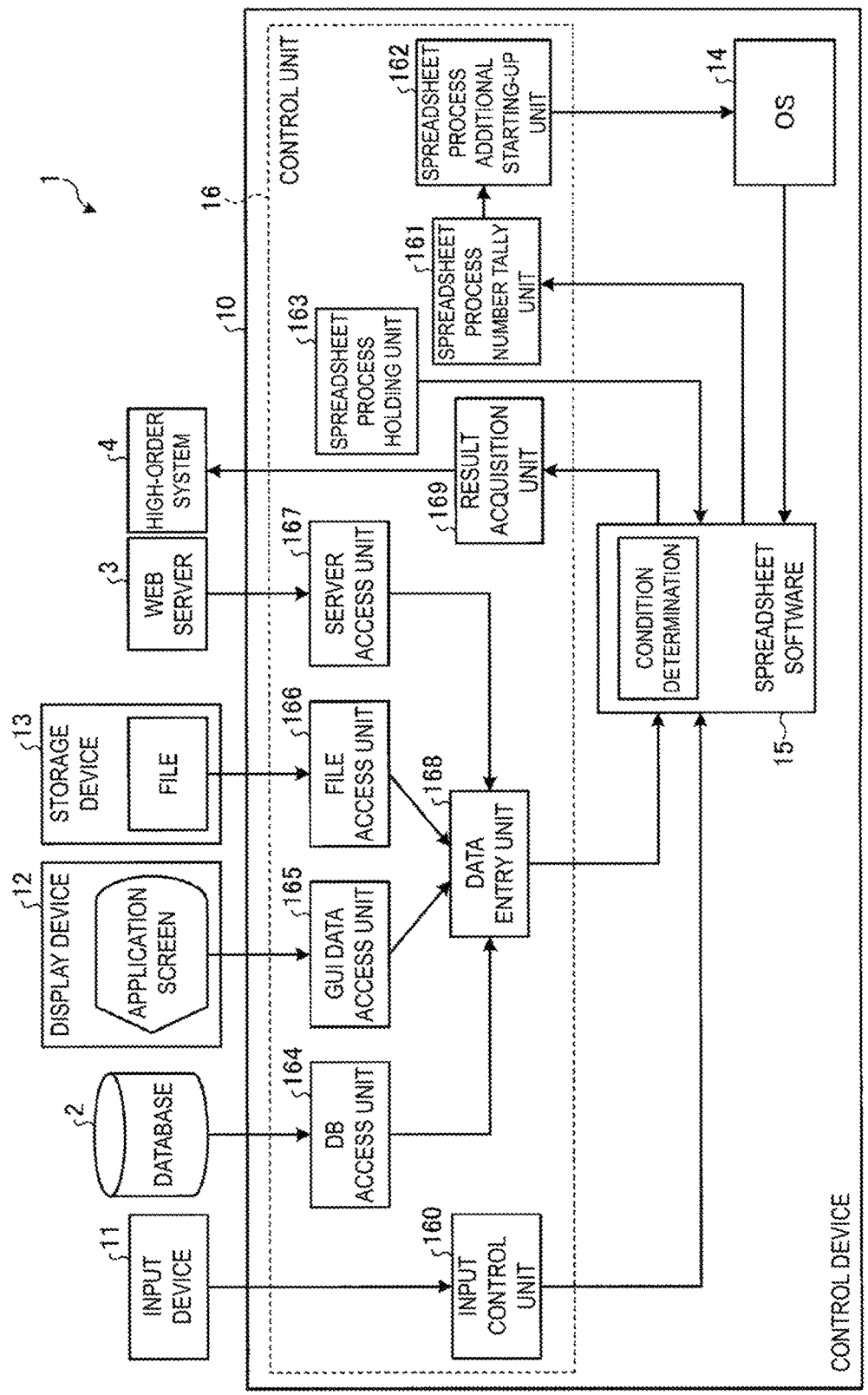
FIG. 1 is a diagram illustrating an example of a configuration of a control system according to an embodiment.

An embodiment of the present disclosure will be described. FIG. 1 is a diagram illustrating an example of a configuration of a control system according to the embodiment. In the control system according to the present embodiment, condition determination is performed on data which is input in a work support system. In this case, in the present embodiment, a user himself or herself can flexibly set conditions with respect to a portion describing a business logic.

As illustrated in FIG. 1, a control system 1 according to the embodiment includes a database 2, a Web server 3, a high-order system 4, and a control device 10. The control device 10 is connected to the database 2, the Web server 3, and the high-order system 4 by a network or the like.

The database (DB) 2 stores various information. The DB 2 reads stored information in response to access by the control device 10, and outputs the information to the control device 10. The Web server 3 is connected to the control device 10 through a network and provides various information in response to access by the control device 10. The high-order system 4 is located at a position higher than the control device 10, and acquires a condition determination result with respect to data which is input to the control device 10. The high-order system 4 collects the acquired condition determination and manages the control device 10.

The control device 10 is a control device configured to allow a user to create a business logic independent of an application and set condition determination by retrieving business rules and separating a conditions determination function on a business logic from a program body in a work support system.

In the control device 10, for example, calculation software itself is used as a portion of a condition determination engine, in addition to using a document of spreadsheet software such as Excel (registered trademark) as a parameter table of a business rule. Thereby, the control device 10 also realizes a conditions determination function on a function of spreadsheet software made by a third party. As a result, according to the control device 10, a region open to a user is expanded, thereby allowing the user to set conditions more flexibly.

Next, a specific configuration of the control device 10 will be described. As illustrated in FIG. 1, regarding the control device 10, an input device 11, a display device 12, and a storage device 13 are connected to the main body of the control device 10. Further, in the main body of the control device 10, an operation system (OS) 14 is executed, and spreadsheet software 15 accompanying the processing of the OS 14 is started up. In addition, the main body of the control device 10 includes a control unit 16. Note that the control device 10 includes a network interface card (NIC) and the like, and also performs communication with an external device through a network or the like.

The input device 11 receives an input of various instruction information with respect to the control unit 16 in response to an input operation performed by a user. For example, the input device 11 receives an input of instruction information regarding the setting of contents entered in a cell of a calculation sheet of the spreadsheet software 15, with respect to the calculation sheet of the spreadsheet software 15. The input device 11 is realized using an input device such as a keyboard or a mouse.

The display device 12 is realized by a liquid crystal display or the like. Specifically, the display device 12 displays an application screen and the like.

The storage device 13 is a storage device such as a hard disk drive (HDD), a solid state drive (SSD), or an optical disc. The storage device 13 may be a semiconductor memory capable of rewriting data such as a random access memory (RAM), a flash memory, or a non-volatile static random access memory (NVSRAM). The storage device 13 stores, for example, files that include various information regarding work support.

The spreadsheet software 15 is spreadsheet software operating on the OS 14. Hereinafter, an example using Excel as the spreadsheet software 15 will be described. In the calculation sheet of the spreadsheet software 15, a business logic is set as inter-cell computation on the calculation sheet. Specifically, when information is entered in an information entry portion of the calculation sheet, a computation method for each cell is set such that a condition determination result for the information entered in the information entry portion is shown by the business logic represented as inter-cell computation. That is, the spreadsheet software 15 is integrated as a portion of various condition determination functions, and determination processing is performed by an inter-cell computation function which is set in the spreadsheet software 15.

The control unit 16 controls the entire control device 10. The control unit 16 may be an electronic circuit such as a central processing unit (CPU) or a micro processing unit (MPU) or an integrated circuit such as an application specific integrated circuit (ASIC) or a field programmable gate array (FPGA). In addition, the control unit 16 includes an internal memory for storing programs and control data specifying various processing procedures, and executes each processing using the internal memory. In addition, the control unit 16 functions as various processing units by various programs operating.

The control unit 16 includes an input control unit 160, a spreadsheet process number tally unit 161 (spreadsheet confirming unit), a spreadsheet process additional starting-up unit 162 (spreadsheet process holding unit), a spreadsheet process holding unit 163 (spreadsheet process holding unit), a DB access unit 164 (acquisition unit), a graphical user interface (GUI) data access unit 165 (acquisition unit), a file access unit 166 (acquisition unit), a server access unit 167 (acquisition unit), a data entry unit 168 (entry unit), and a result acquisition unit 169.

The input control unit 160 sets contents entered in a cell on the calculation sheet based on instruction information received by the input device 11 in response to a user operation. For example, the user operates the input device 11, and changes an access destination serving as an information acquisition source. Thereby, when the input device 11 receives information for giving an instruction for changing an information acquisition source of a calculation sheet, the input control unit 160 changes entered contents of an information acquisition source in an instruction target cell among the cells of the calculation sheet, in accordance with instruction information. In addition, for example, a user operates the input device 11 to change a portion of inter-cell computation. Thereby, when the input device 11 receives information for giving an instruction for changing a portion of inter-cell computation of a calculation sheet, the input control unit 160 changes an inter-cell computation of a target cell among the calculation sheet in accordance with instruction information.

The spreadsheet process number tally unit 161 confirms whether the spreadsheet software 15 has been started up. The spreadsheet process number tally unit 161 tallies the number of pieces of started up spreadsheet software 15.

When the spreadsheet process number tally unit 161 determines that the spreadsheet software 15 has not been started up, the spreadsheet process additional starting-up unit 162 starts up the spreadsheet software 15. When the spreadsheet process number tally unit 161 determines that the spreadsheet software 15 has been started up, the spreadsheet process additional starting-up unit 162 additionally starts up second spreadsheet software 15.

When the spreadsheet software 15 has been started up, the spreadsheet process holding unit 163 holds the started-up spreadsheet software 15 such that the started-up spreadsheet software 15 is not terminated. Specifically, the spreadsheet process holding unit 163 connects to a component object model (COM) application programming interface (API) of a process being started-up to hold the spreadsheet software 15 so that the spreadsheet software 15 is not terminated even when a user has closed all documents.

The DB access unit 164 accesses the DB 2 to acquire information. The GUI data access unit 165 acquires information through a GUI on an application screen of the display device 12. The file access unit 166 accesses a file stored in the storage device 13 to acquire information. The server access unit 167 accesses the Web server 3 to acquire information. The DB access unit 164, the GUI data access unit 165, the file access unit 166, and the server access unit 167 access an external device or the like which is an information source entered in an information acquisition source column of the spreadsheet software 15 to acquire information set in the information acquisition source column.

The data entry unit 168 enters information acquired by the DB access unit 164, the GUI data access unit 165, the file access unit 166, and the server access unit 167 at information entry portions of the calculation sheet of the spreadsheet software 15. Note that, as described above, a business logic is set in the calculation sheet as inter-cell computation on the calculation sheet.

When determination results for information entered in an information entry portion are shown on the calculation sheet by a business logic represented as inter-cell computation, the result acquisition unit 169 acquires the determination results on the calculation sheet and notifies the high-order system 4 of the acquired determination results.

Description of Operation Processing of Control Device

Figure 2:
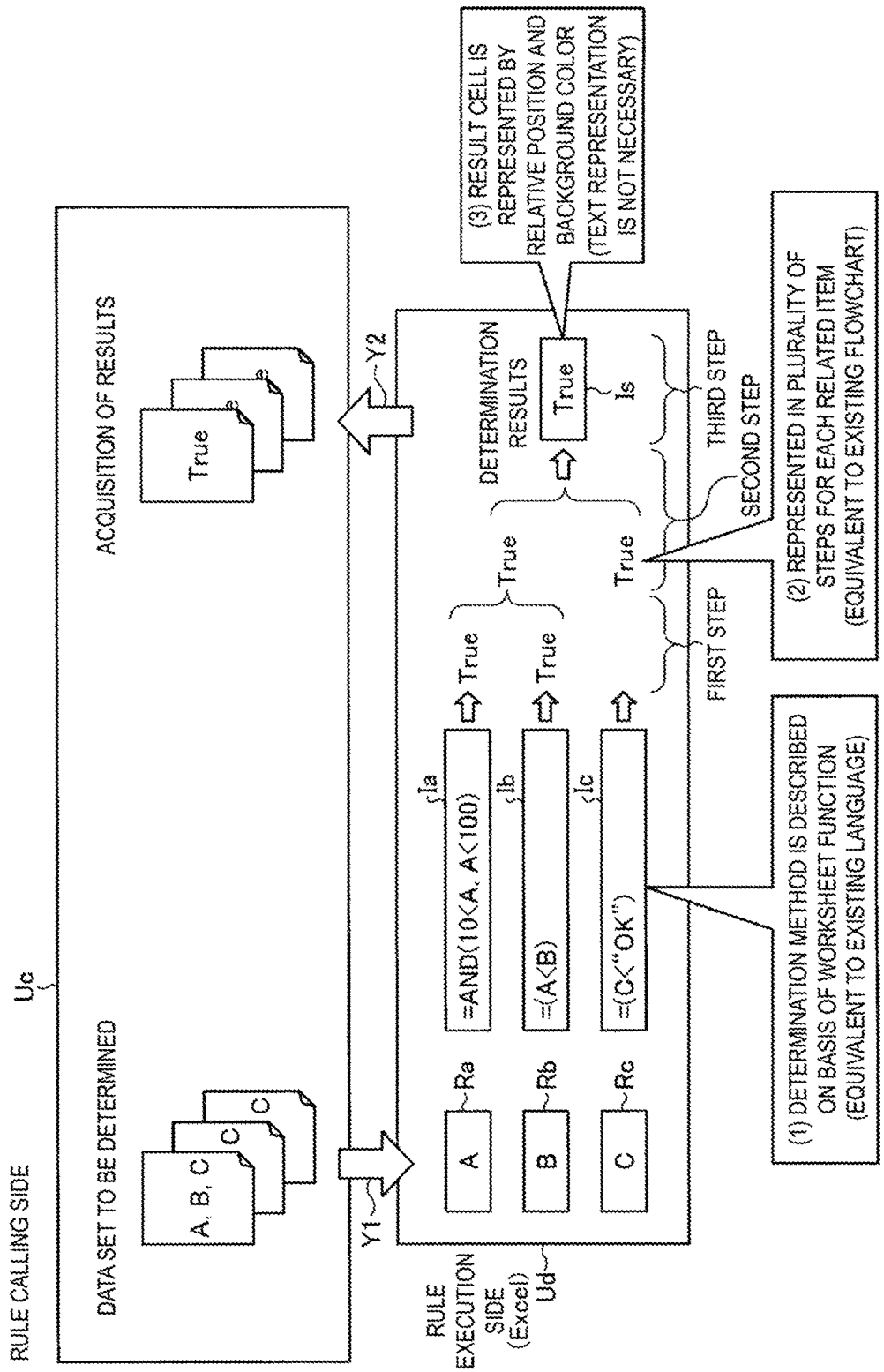
FIG. 2 is a diagram illustrating an image of operation of a control device illustrated in FIG. 1.

Next, the operation processing of the control device 10 will be described schematically. FIG. 2 is a diagram illustrating an operation image of the control device 10 illustrated in FIG. 1.

As illustrated in FIG. 2, in the control device 10, operation processing for condition determination is executed by executing processing divided into a rule calling side Uc and a rule execution side Ud. On the rule calling side Uc, designation of a rule to be executed, setting of input parameters, calling of a rule, and acquisition of execution results are performed. In the rule execution side Ud, a rule is executed using an Excel calculation sheet.

The rule calling side Uc inputs data sets "A", "B", and "C" to be determined to the Excel calculation sheet on the rule execution side Ud (see arrow Y1). Thereby, in the rule execution side Ud, the pieces of data "A", "B", and "C" are entered in cells Ra, Rb, and Rc in the Excel calculation sheet.

Here, a determination method is described in the Excel calculation sheet on the rule execution side Ud using a worksheet function (see (1) of FIG. 2). Specifically, as in the worksheet function described in cells Ia, Ib, and Ic, a business logic is set as inter-cell computation on the computation sheet. The description of the worksheet function is equivalent to a business logic of the related art which is described in its own language.

Further, in Excel on the rule execution side Ud, determination results are represented in a plurality of steps for each related item (see (2) of FIG. 2). This is equivalent to a flowchart sowing determination processing in the related art.

For example, as a first step of the plurality of steps, in a cell Ia, determination "True" for data A is derived by a determination method described in the cell Ia. In a cell Ib, determination "True" for data B is derived by a determination method described in the cell Ib. Further, in a cell Ic, determination "True" for data C is derived by a determination method described in the cell Ic.

Subsequently, determination "True" is derived in a second step based on the determination "True" in the cell Ia and the determination "True" in the cell Ib. Further, in a third step, final determination "True" is derived based on the determination "True" in the second step and the determination "True" in the cell Ic.

Further, in Excel on the rule execution side Ud, a result cell is represented by a relative position or a background color (see (3) of FIG. 2). For example, in Excel on the rule execution side Ud, in a case where a cell Is is a cell indicating a final determination result, the position of the cell Is is set to be a lowest row, which represents that the cell is a cell indicating a final result. Alternatively, the background color of the cell Is is set to be a background color meaning a final result designated in advance, which represents that the cell is a cell indicating a final result. Thereby, it is not necessary to designate how the rule calling side Uc receives a determination result from the rule execution side Ud by a separate text expression.

In addition, the rule calling side Uc acquires a final determination result (for example, "True") shown in the cell Is (see an arrow Y2) from the cell Is indicating a final determination result, and notifies the high-order system 4 of the acquired final determination result.

In the control device 10, a parameter table used to set input parameters is created by Excel. Further, in the control device 10, a business logic indicating the execution of a rule is described using a worksheet function of Excel. Further, an external I/F definition method is indicated by cell attributes (values, positions, colors) of Excel.

Description Example

Figure 3:
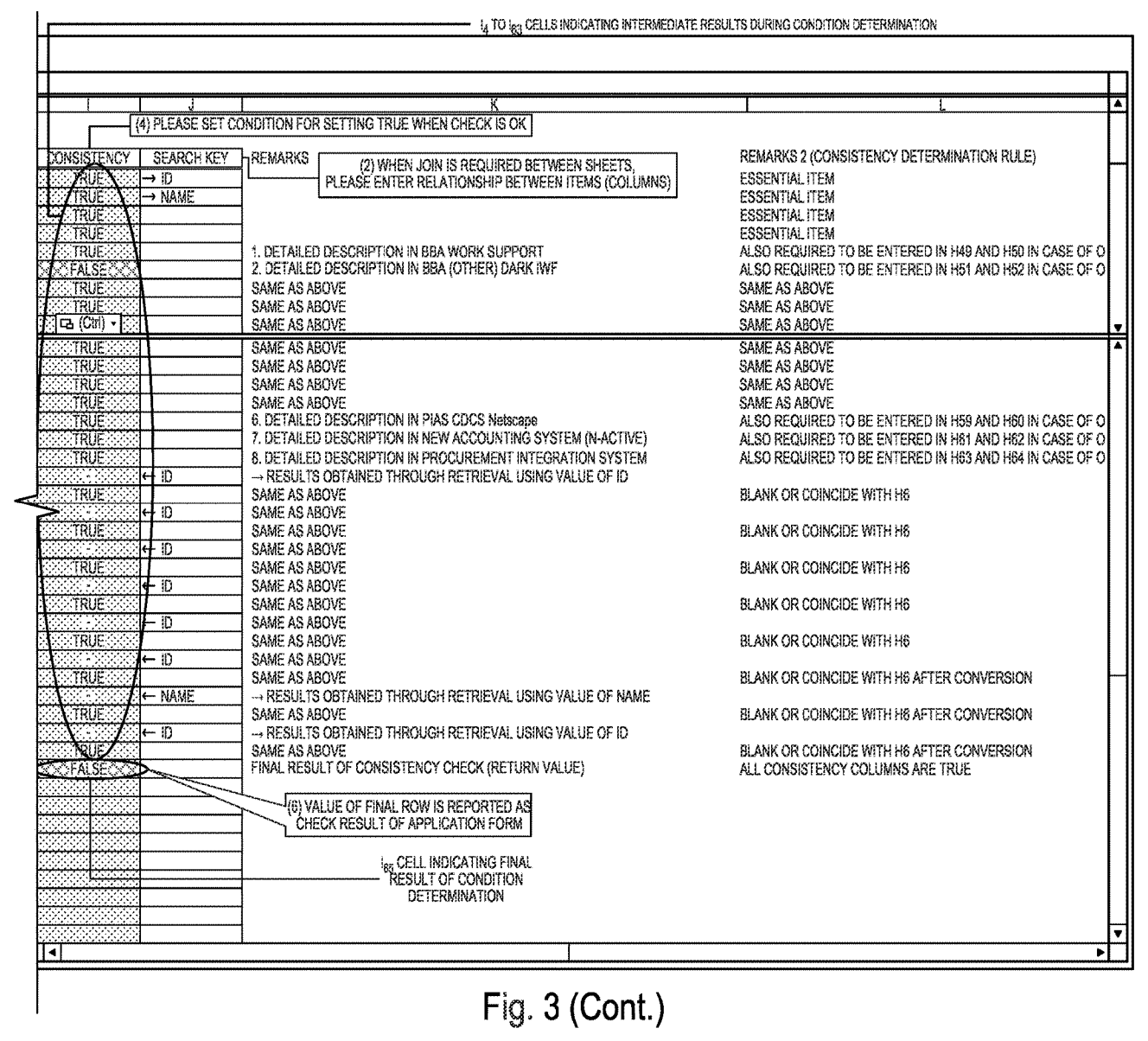

Next, an example of description in an Excel calculation sheet used by the control device 10 will be described. FIG. 3 is a diagram illustrating an example of description in an Excel calculation sheet used by the control device 10 illustrated in FIG. 1.

As shown in an Excel calculation sheet T1 illustrated in FIG. 3, columns A to G are columns including a cell (first cell) in which information indicating an information acquisition source is described. In addition, a column H is a column including a cell (second cell) in which information acquired from an information acquisition source is entered.

In addition, a column I is a column (third cell), including cells $I_4$ to $I_{64}$ (fourth cells) and a cell $I_{65}$ (fifth cell) indicating a determination result using a relative position and a background color, in which a determination method is described based on a worksheet function using information acquired from an information acquisition source.

The cells $I_4$ to $I_{64}$ are cells which indicate an intermediate result of condition determination and in which a determination method is described based on a worksheet function using information acquired from an information acquisition source. The cells $I_4$ to $I_{64}$ are cells which indicate a determination result of each related item and in which a determination method performed in a plurality of steps is described using a worksheet function for each related item. The cell $I_{65}$ is a cell which indicates a final determination result and in which a determination method for determining a final determination result based on determination results indicated by the cells $I_4$ to $I_{64}$ is described using a worksheet function. For example, in Excel on the rule execution side Ud, a cell $I_{65}$ indicating a final determination result is set to be located in the same column as cells $I_4$ to $I_{64}$ indicating an intermediate result and located in a cell next to the cell I64. Further, the cells $I_4$ to $I_{65}$ indicate "True" in a case where a background color is, for example, orange, and indicate "False" in a case where when a background color is yellow.

In the columns A to G, the setting of entered contents can be changed by a user's operation through the input device 11. The user can change the setting of information indicating an information acquisition source in the columns A to G. The calculation sheet T1 in FIG. 3 is an example in which another Excel form is designated as an information acquisition source. When the user designates (columns A to G) a sheet name, cell coordinates, and the like in a cell which is an information acquisition source through the input device 11 and the input control unit 160, the file access unit 166 acquires values stored in the designated information acquisition source. In addition, the data entry unit 168 copies the values acquired by the file access unit 166 to a corresponding cell of the column H on the calculation sheet. Note that comments described in (1) to (6) of FIG. 3 are displayed to assist in inputting information to the calculation sheet T1.

The control device 10 can also designate screen display on the DB 2, a Web service on the Internet (Web server 3), and the display device 12 of another application which is used at the same time as an information acquisition source, in addition to the Excel form. In this case, the DB access unit 164, the GUI data access unit 165, and the server access unit 167 acquire data from the designated acquisition source.

In other words, the file access unit 166, the DB access unit 164, the GUI data access unit 165, and the server access unit 167 acquire information by accessing the information acquisition source described in the first cell. In addition, the data entry unit 168 enters information acquired by the file access unit 166, the DB access unit 164, the GUI data access unit 165, and the server access unit 167 in the second cell.

In this manner, the control device 10 has a function of acquiring all information related to condition determination and aggregating the information on a single calculation sheet.

Here, the control device 10 separates a determination method for information related to determination from a determination logic, and describes a determination logic for determining consistency of input information as cell definition (inter-cell computation) in the spreadsheet software 15. In the calculation sheet T1, a determination logic is described in the cells 4 to 165.

For example, conditions to be satisfied by input information areas follows.

The value of the cell A falls within a specific range.
The value of the cell A and the value of the cell B satisfy a specific relationship.
The values derived from the cell A and the cell B are equal to the value of the cell C.

In the calculation sheet, conditions can be entered in a cell in such a format, and the value of "True" or "False" is stated so as to return a result of inter-cell computation.

Figures 4, 5:
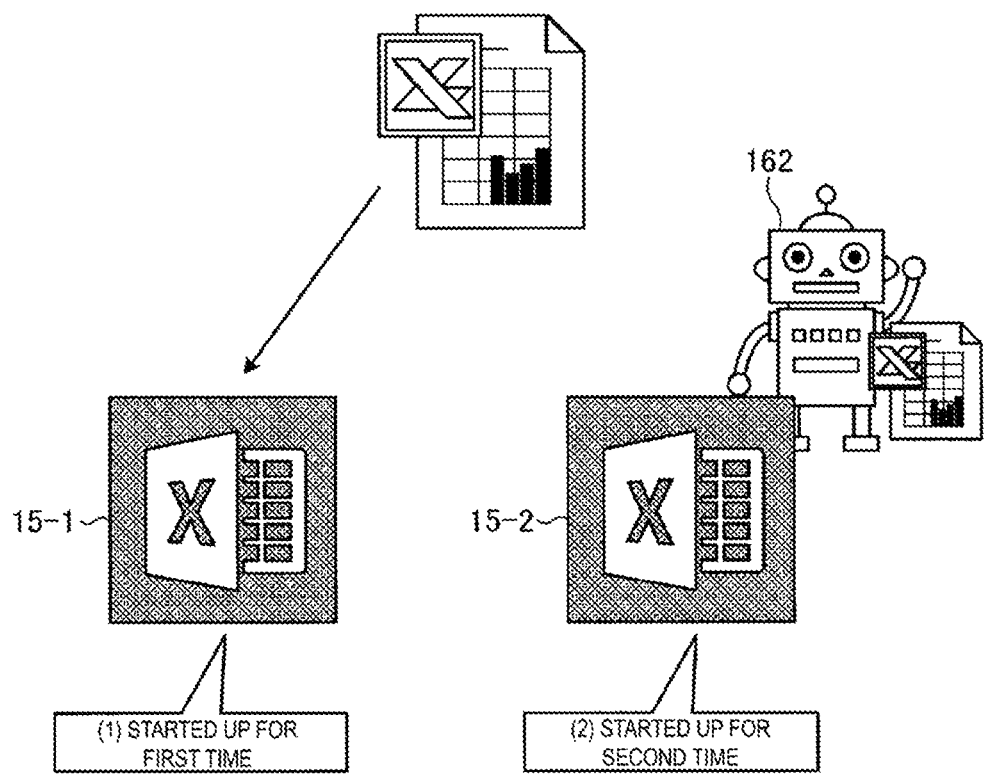
FIG. 4 is a diagram illustrating an example of description in a cell in which inter-cell computation is defined.
FIG. 5 is a diagram illustrating the incorporation of Excel into a system in the control device illustrated in FIG. 1.

FIG. 4 is a diagram illustrating an example of description in a cell in which inter-cell computation is defined. The description of a cell Pe in FIG. 4 means a case where a cell H50 of the calculation sheet T1 (an application type of a detailed information sheet) is blank and means "True" when the cell H50 coincides with a cell H7 (an application type of a summary sheet) of the calculation sheet T1 in a case where the cell H50 is not blank.

In the cells $I_4$ to $I_{65}$, a determination method performed in a plurality of steps is described using a worksheet function in accordance with the respective related items. Among these, the cells $I_4$ to $I_{64}$ are cells indicating an intermediate result of condition determination, and the cell $I_{65}$ is a cell indicating a final determination result. For this reason, the result acquisition unit 169 acquires a final determination result "True" from the cell 164 and notifies the high-order system 4 of the acquired determination result "True" as a determination result based on a data set entered in the columns B to G.

Incorporation of Excel into System

Next, the incorporation of the control device 10 into a system of Excel will be described. FIG. 5 is a diagram illustrating the incorporation of Excel into a system in the control device 10 illustrated in FIG. 1.

Here, in a case where a GUI based tool is incorporated into automatic processing, interference between an automatic operation and a user's operation may be a problem. Thus, in order to stabilize the automatic processing, a dedicated terminal is provided, or an operation in which a user cannot operate a tool during processing is required.

On the other hand, in the present embodiment, Excel can be incorporated into the system as a portion of a processing mechanism by causing parallel and stable automatic processing to be performed by the following method even when the user is operating a tool as usual.

First, a plurality of Excel documents can be started up at the same time, but a calculation sheet 15-1 of the Excel which is first started up is registered in the OS 14 as a DDE server (see (1) of FIG. 5). This means the Excel which is used when the user double clicks on an Excel document.

A calculation sheet 15-2 started up by the spreadsheet process additional starting-up unit 162 from the second time can be controlled from only a process that started up the Excel, and thus this Excel can be set to be exclusive for automatic processing so that parallel processing can be performed without disturbing a user's operation. Thus, in the control device 10, in a case where the spreadsheet software 15 has not been started up, the spreadsheet process additional starting-up unit 162 starts up the spreadsheet software 15. Further, in the control device 10, in a case where spreadsheet software 15-1 has been started up, the spreadsheet process additional starting-up unit 162 additionally starts up the second spreadsheet software 15-2 (see (2) of FIG. 5).

Further, in a case where the Excel first started up is terminated, registration as a DDE server is deleted temporarily, and the Excel which is currently started up is registered instead. When this state occurs, the process that has been used for automatic processing can be operated by a user, and thus automatic processing cannot be correctly performed.

In order to prevent this problem, the control device 10 prevents the first Excel from being terminated even when the user has closed all of the Excel documents. Specifically, when the spreadsheet software 15 has been started up, the spreadsheet process holding unit 163 holds the started-up spreadsheet software 15 so that it is not terminated. For example, the spreadsheet process holding unit 163 accesses a COM API of a process that is started up. In this manner, the spreadsheet process holding unit 163 holds the connection to the spreadsheet software 15 so that a started-up spreadsheet software is recognized as being used even when the user has closed all of the documents, thereby the spreadsheet software 15 being held such that it is not terminated.

Processing Procedure of Control Processing

Figure 6:
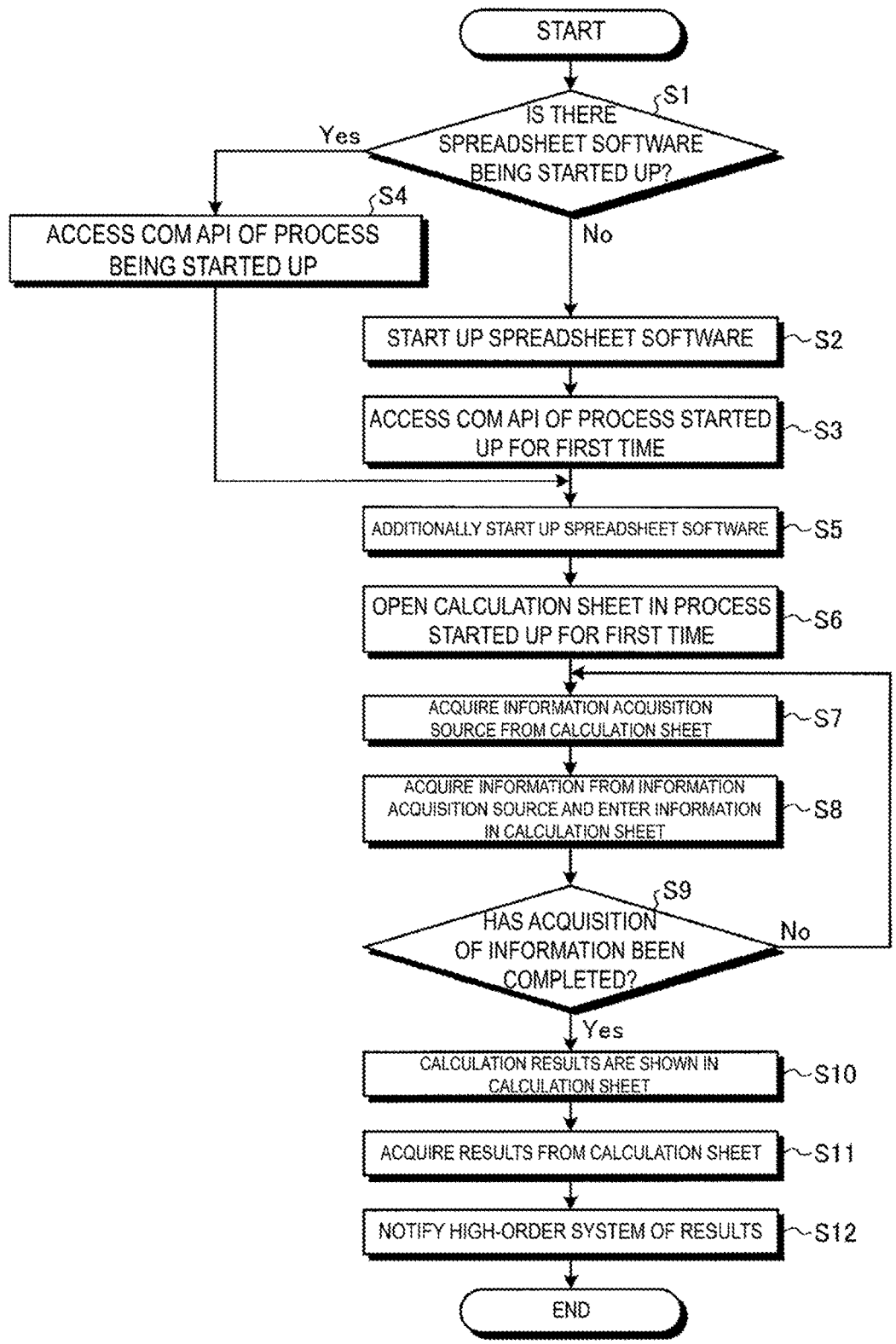
FIG. 6 is a flowchart illustrating a processing sequence of control processing performed by the control device illustrated in FIG. 1.

Next, a processing procedure of control processing performed by the control device 10 constituting the work support system will be described. FIG. 6 is a flowchart illustrating a processing procedure of control processing performed by the control device 10 illustrated in FIG. 1.

As illustrated in FIG. 6, in the control device 10, the spreadsheet process number tally unit 161 confirms whether the spreadsheet software 15 has been started up, and determines whether there is a started-up spreadsheet software 15 (step S1).

In a case where the spreadsheet process number tally unit 161 determines that there is no started-up spreadsheet software 15 (step S1: No), the spreadsheet process additional starting-up unit 162 starts up the spreadsheet software 15 (step S2). In addition, the spreadsheet process holding unit 163 accesses COM API of the started-up process (step S3) to hold the started-up spreadsheet software 15 from being terminated.

In a case where the spreadsheet process number tally unit 161 determines that there is a spreadsheet software 15 that is started up (step S: Yes), the spreadsheet process holding unit 163 accesses the COM API of the started-up process (step S4) to hold the started-up spreadsheet software 15 from being terminated.

The spreadsheet process additional starting-up unit 162 additionally starts up the second spreadsheet software 15 (step S5). In addition, the control device 10 opens a calculation sheet for determining a business logic in a process which was last started up (step S6).

The file access unit 166, the DB access unit 164, the GUI data access unit 165, and the server access unit 167 acquire information indicating an information acquisition source from a first cell of the calculation sheet (step S7). In addition, the file access unit 166, the DB access unit 164, the GUI data access unit 165, and the server access unit 167 acquire information from each information acquisition source. Further, the data entry unit 168 enters information acquired by the file access unit 166, the DB access unit 164, the GUI data access unit 165, and the server access unit 167 in a second cell of the calculation sheet (step S8).

The data entry unit 168 determines whether the acquisition of information has been completed (step S9). When the data entry unit 168 determines that the acquisition of information has not been completed (step S9: No), the control unit 16 returns to step S7 to continue acquiring information.

On the other hand, when the data entry unit 168 determines that the acquisition of information has been completed (step S9: Yes), determination results are shown in a third cell of the calculation sheet through inter-cell computation (step S10). The result acquisition unit 169 acquires the determination results from the calculation sheet (step S11), and notifies the high-order system 4 of the acquired determination results (step S12).

Effects of Embodiment

Here, a conditions determination function of a work support system of the related art will be described. In the related art, a business rule management system (BRMS) separates a conditions determination function from a program body to easily reduce the number of development steps and change requirements.

Figures 7A, 7B:
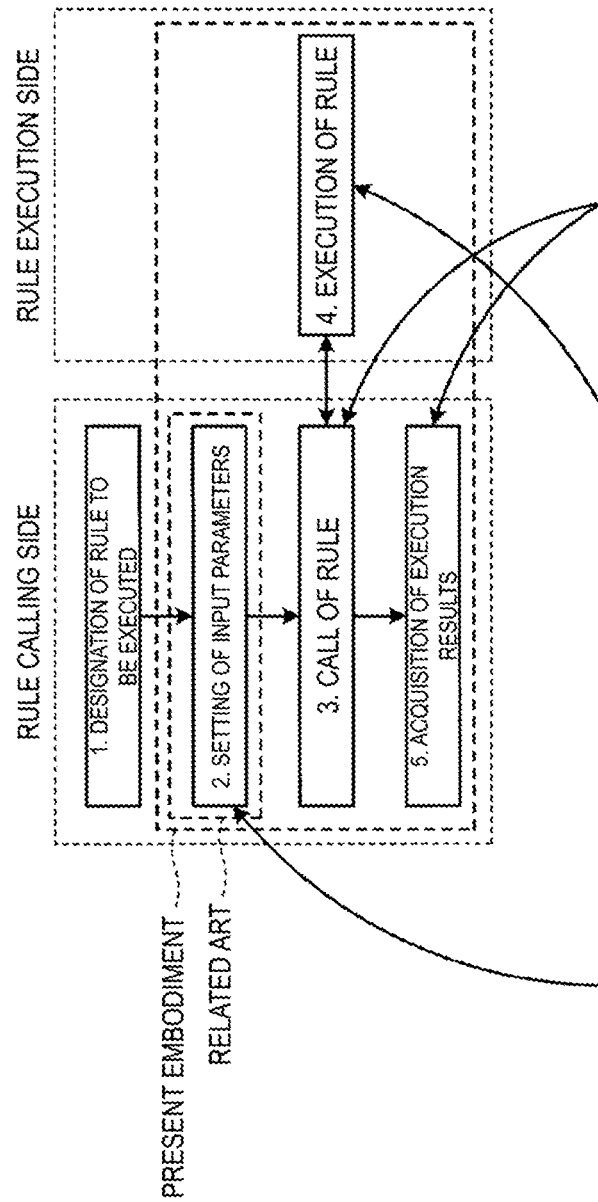
FIGS. 7A and 7B are diagrams illustrating a difference between the related art and the present embodiment.
Figure 8:
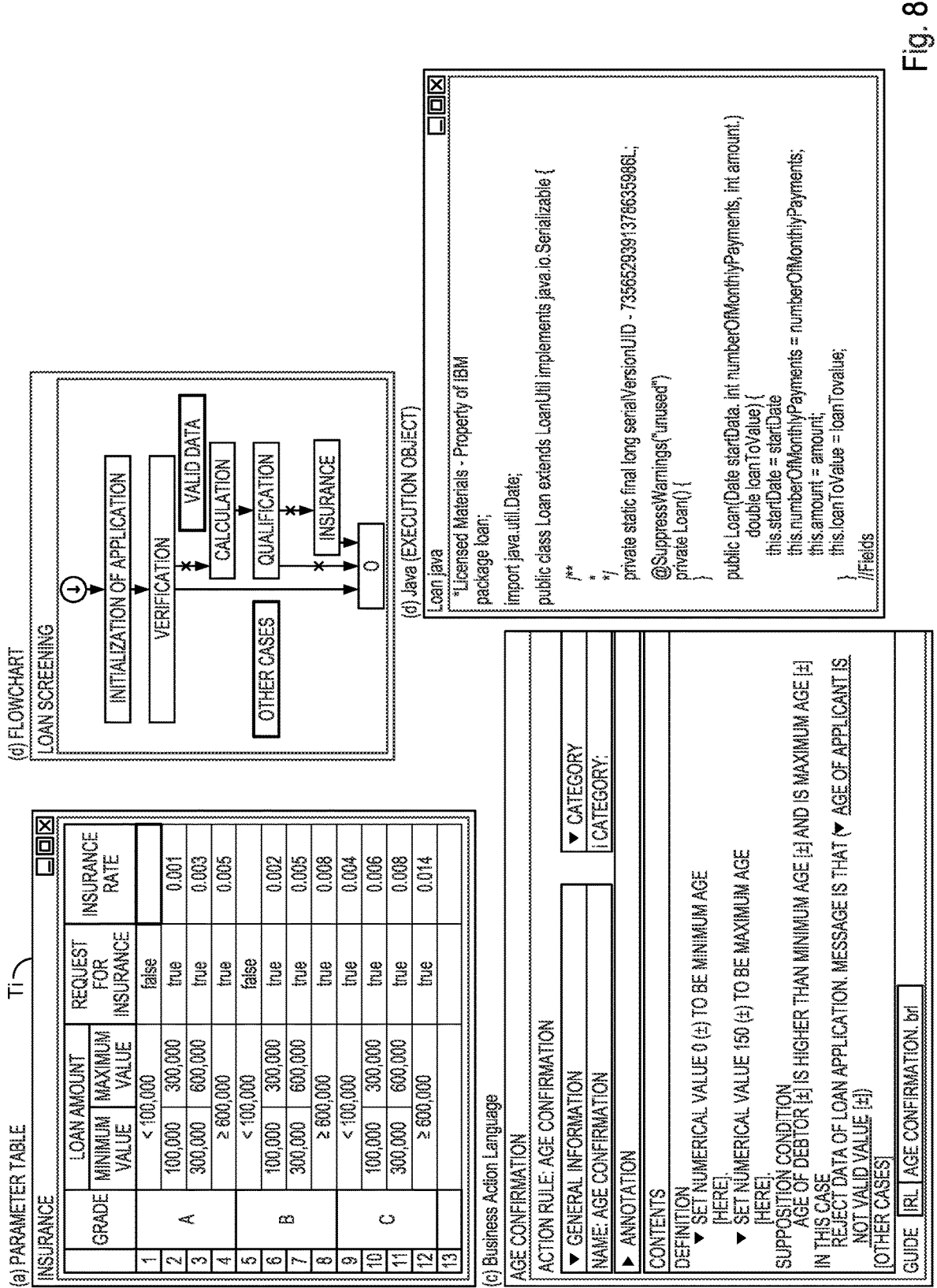
FIG. 8 is a set of diagrams illustrating data used at the time of rule calling and rule execution in ILOG JRules of the related art.

FIGS. 7A and 7B are diagrams illustrating a difference between the related art and the present embodiment. Here, FIG. 7A is a diagram illustrating processing performed on a rule calling side and a rule execution side, and FIG. 7B is a diagram illustrating a parameter table, a business logic description language, and an external I/F definition method used in each technique. FIG. 8 is a set of diagrams illustrating data used at the time of rule calling and rule execution in ILOG JRules of the related art. FIG. 9 is a set of diagrams illustrating data used at the time of rule calling and rule execution in JBoss Rules of the related art.

On the rule calling side, designation of a rule to be executed (see 1 in FIG. 7A), setting of input parameters (see 2 in FIG. 7A), calling of a rule (see 3 in FIG. 7A), and acquisition of execution results (see 5 in FIG. 7A) are performed. In addition, on the rule execution side, execution of a rule (see 4 in FIG. 7A) is performed.

In ILOG JRules of the related art, the setting of input parameters on the rule calling side (see 2 in FIG. 7A) is performed according to a parameter table using an RDB (DB 2) and a management tool (see, for example, a table Ti in (a) of FIG. 8). Further, in ILOG JRules, regarding the calling of a rule (see 3 in FIG. 7A) and the acquisition of execution results (see 5 in FIG. 7A), XML is used as an external I/F definition method. Further, in ILOG JRules, a business logic description language used in the execution of a rule on the rule execution side (see 4 in FIG. 7A) is described in its own description language (Business Action Language) (see (c) of FIG. 8) and Java (registered trademark) (see (d) of FIG. 8), and processing is set to proceed according to a flowchart illustrated in (b) of FIG. 8.

In the ILOG JRules, specific parameters (a boundary value and the like) can be arranged as a table, so that portions that are changed frequently in performing work can be changed by non-experts.

Further, in the JBoss Rules of the related art, the setting of input parameters on the rule calling side (see 2 in FIG. 7A) is performed according to a parameter table using Excel and a rule file embedded (Text) file (see, for example, a table Tj in (a) of FIG. 9). Further, in the JBoss Rules, regarding the calling of a rule (see 3 in FIG. 7A) and the acquisition of execution results (see 5 in FIG. 7A), Java (registered trademark) Rule Engine API is used as an external I/F definition method. Further, in the JBoss Rules, a business logic description language used in executing a rule on the rule execution side (see 4 in FIG. 7A) is described in its own description language (declarative domain-specific language (DSL)) (see (b) of FIG. 9).

Further, in this JBoss Rules, a correction operation can be performed using a method familiar to a user by using spreadsheet software made by a third party as a parameter supply source or a parameter setting editor.

However, in the related art, specialized knowledge including development language is required for a portion describing logic, and it has been difficult for a general user to directly create a portion describing logic.

On the other hand, in the present embodiment, the setting of input parameters on the rule calling side (see 2 in FIG. 7A) is performed according to a parameter table using Excel. Further, in the present embodiment, regarding the calling of a rule (see 3 in FIG. 7A) and the acquisition of execution results (see 5 in FIG. 7A), cell attributes (a value, a position, a color) of Excel is used as an external I/F definition method. Further, in the present embodiment, a business logic description language used in executing a rules on the rule execution side (see 4 in FIG. 7A) is also described using a worksheet function of Excel.

Thus, in the present embodiment, all of the parameter table, the business logic description language, and the external I/F definition method are realized by Excel and are open to a user. That is, in the present embodiment, a business logic which has required specialized knowledge so far is also realized on a function of spreadsheet software made by a third party and can be dealt with by even a general user. For this reason, according to the present embodiment, in a conditions determination function, a region open to a user is expanded, and condition setting which is more flexible for a user can be performed.

In this manner, in the control device 10 of the present embodiment, spreadsheet software is integrated as a portion a condition determination processing function in the work support system, so that determination processing is performed using an inter-cell computation function included in the spreadsheet software itself. As a result, according to the control device 10, a user does not need knowledge such as development environments and languages other than the spreadsheet software. Thus, according to the present embodiment, there is an effect that a user can flexibly set conditions for a portion describing logic in the work support system.

In addition, according to the present embodiment, as a secondary effect, determination results of input values are fed back in real time as spreadsheet processing, and thus a user can easily find a setting error or correct an error.

Further, in the present embodiment, a start up of spreadsheet software is confirmed, and spreadsheet software is newly started up when the spreadsheet software has not been started up. In addition, when spreadsheet software has been started up, the started-up spreadsheet software is held so that is not terminated, and second spreadsheet software is then started up. Thus, in the present embodiment, even when a user has closed all documents, spreadsheet software is held so as not to be terminated by causing the spreadsheet software to be recognized as being used, thereby making it possible to perform stable work support.

System Configuration and the Like

The components of each device illustrated in the drawing are functional and conceptual components and are not necessarily physically configured as illustrated in the drawing. That is, specific configurations of dispersion and integration of the devices are not limited to those illustrated in the drawing, and all or some of them can be configured to be functionally or physically dispersed and integrated in any unit in accordance with various loads, usage conditions, and the like. Further, all or some of processing functions performed by the devices may be realized by a CPU and a program analyzed and executed by the CPU, or may be realized as hardware by wired logic. The control device 10 according to the present embodiment can also be realized by a computer and a program, and can also record a program in a recording medium and provide a program through a network.

Further, all or some of the processes described as being automatically performed, among the processes described in the present embodiment, can also be manually performed, or all or some of the processes described as being manually performed can also be automatically performed by a known method. In addition, information including the processing procedures, the control procedures, the specific names, and various data and parameters described in the above-described document and drawings can be arbitrarily changed except for the case of special description.

Program

Figure 10:
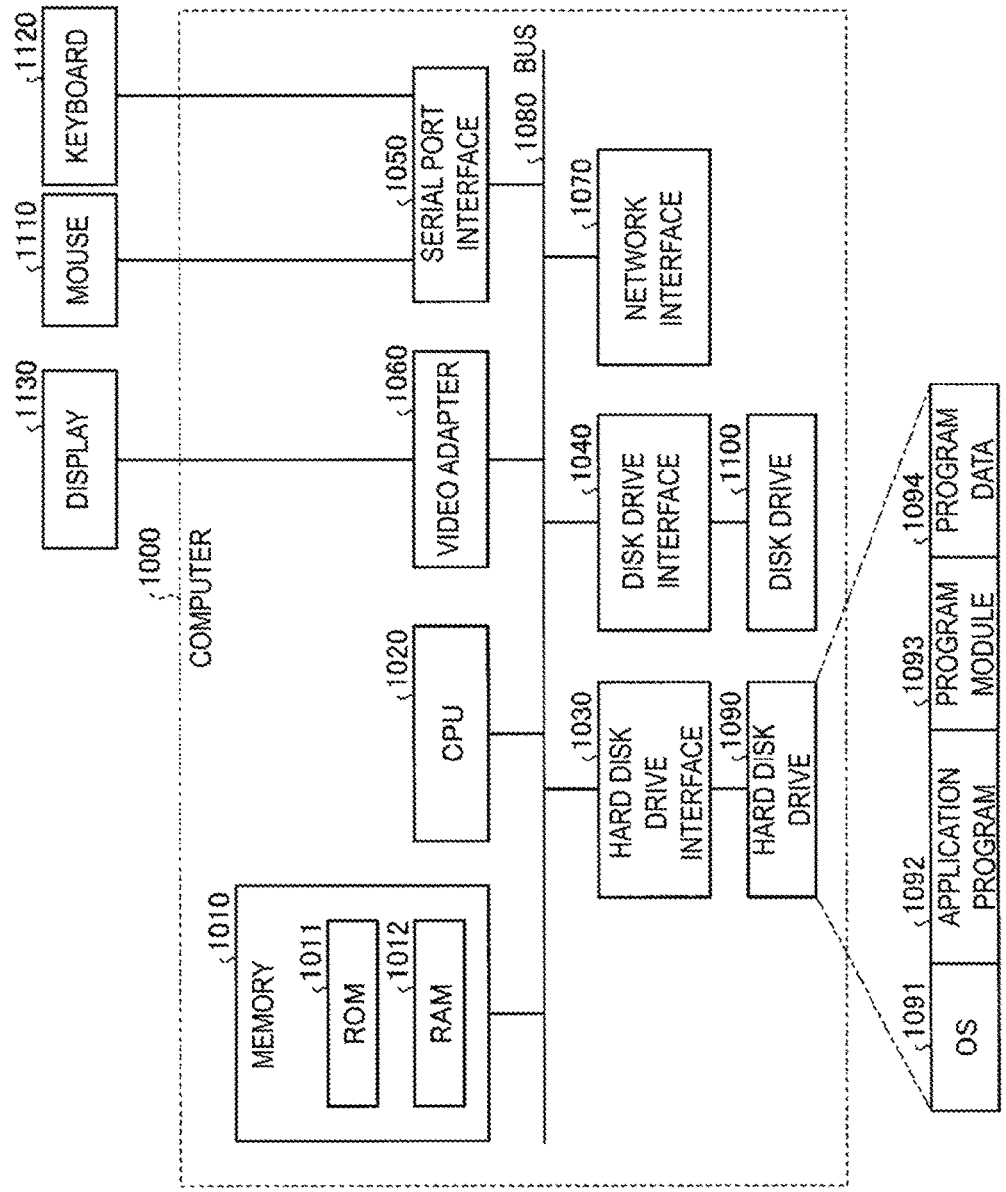
FIG. 10 is a diagram illustrating an example of a computer in which a control device is realized by executing a program.

FIG. 10 is a diagram illustrating an example of a computer for realizing the control device 10 by executing a program. A computer 1000 includes, for example, a memory 1010 and a CPU 1020. In addition, the computer 1000 includes a hard disk drive interface 1030, a disk drive interface 1040, a serial port interface 1050, a video adapter 1060, and a network interface 1070. The respective components are connected via a bus 1080.

The memory 1010 includes a read only memory (ROM) 1011 and a RAM 1012. The ROM 1011 stores a boot program such as a basic input output system (BIOS), for example. The hard disk drive interface 1030 is connected to a hard disk drive 1090. The disk drive interface 1040 is connected to a disk drive 1100. A detachable storage medium such as a magnetic disk or an optical disc is inserted into the disk drive 1100. The serial port interface 1050 is connected to, for example, a mouse 1110 and a keyboard 1120. A video adapter 1060 is connected to, for example, a display 1130.

Here, the hard disk drive 1090 stores, for example, an OS 1091, an application program 1092, a program module 1093, and program data 1094. That is, a program for specifying each processing of the control device 10 is mounted as the program module 1093 in which code executable by the computer 1000 is described. The program module 1093 is stored in, for example, the hard disk drive 1090. For example, the program module 1093 for executing processing similar to the functional configuration in the control device 10 is stored in hard disk drive 1090. Note that the hard disk drive 1090 may be replaced by an SSD.

In addition, setting data used in the processing of the above-described embodiment is stored in, for example, the memory 1010 or the hard disk drive 1090, as the program data 1094. In addition, the CPU 1020 reads the program module 1093 and the program data 1094 stored in the memory 1010 and the hard disk drive 1090 to the RAM 1012 and executes them as necessary.

Note that the program module 1093 and the program data 1094 are not limited to a case where they are stored in the hard disk drive 1090, and, for example, may be stored in a detachable storage medium and read by the CPU 1020 through the disk drive 1100 or the like. Alternatively, the program module 1093 and the program data 1094 may be stored in another computer connected thereto through a network (a LAN, a wide area network (WAN), or the like). In addition, the program module 1093 and the program data 1094 may be read by the CPU 1020 from another computer through the network interface 1070.

Although the embodiment to which the disclosure made by the inventor is applied has been described above, the disclosure is not limited by the description and the drawings as a part of the disclosure of the present disclosure according to the embodiment. In other words, all of other embodiments, examples, operation technologies, and the like made by those skilled in the art based on the present embodiment are within the scope of the disclosure.

REFERENCE SIGNS LIST

1 Control system
2 Database (DB)
3 Web Server
4 high-order system
10 Control device
11 Input device
12 Display device
13 Storage device
14 OS
15 Spreadsheet software
16 Control unit
160 Input control unit
161 Spreadsheet process number tally unit
162 spreadsheet process additional starting-up unit
163 spreadsheet process holding unit
164 DB access unit
165 GUI data access unit
166 File access unit
167 Server access unit
168 Data entry unit
169 Result acquisition unit

The invention claimed is:

1. A control device comprising:
a spreadsheet confirming unit, including one or more processors, configured to confirm a start up of spreadsheet software;
a spreadsheet process holding unit, including one or more processors, configured to newly start up the spreadsheet software, when the spreadsheet software has not been started up, and, when the spreadsheet software has been started up, configured to start up second spreadsheet software after holding the started up spreadsheet software such that the started up spreadsheet software is not terminated;
an acquisition unit, including one or more processors, configured to access an information acquisition source to acquire information;
an entry unit, including one or more processors, configured to enter the information acquired by the acquisition unit in an information entry portion of a calculation sheet of the spreadsheet software, the calculation sheet being a calculation sheet in which a business logic is set for inter-cell computation on the calculation sheet; and
a result acquisition unit, including one or more processors, configured to acquire a determination result on the calculation sheet when a determination result for the information entered in the information entry portion is shown by the business logic represented as inter-cell computation on the calculation sheet, and notify a high-order system of the acquired determination result.

2. The control device according to claim 1, further comprising:
an input unit, including one or more processors, configured to receive an input of instruction information regarding setting of entered contents in a cell of the calculation sheet with respect to the calculation sheet of the spreadsheet software; and
an input control unit, including one or more processors, configured to set entered contents in the cell on the calculation sheet based on the instruction information received by the input unit.

3. The control device according to claim 1, wherein
the calculation sheet includes a first cell in which information indicating an information acquisition source is described, a second cell in which information acquired from the information acquisition source is entered, and a third cell in which a determination method is described based on a worksheet function using the information acquired from the information acquisition source and which indicates a determination result using a relative position or a background color,
the acquisition unit configured to access the information acquisition source described in the first cell to acquire information,
the entry unit configured to enter the information acquired by the acquisition unit in the second cell, and
the result acquisition unit configured to acquire the determination result indicated in the third cell.

4. The control device according to claim 3, wherein
the third cell includes, for each related item, a fourth cell in which a determination method performed in a plurality of steps is described based on a worksheet function to indicate a determination result of each related item, and a fifth cell in which a determination method for determining a final determination result based on the determination result indicated by each fourth cell is described based on a worksheet function and which indicates the final determination result, and
the result acquisition unit configured to acquire the final determination result from the fifth cell.

5. A control method executed by a control device, the control method comprising:
confirming a start up of spreadsheet software;
when the spreadsheet software has not been started up, newly starting up the spreadsheet software, and, when the spreadsheet software has been started up, starting up second spreadsheet software after holding the started up spreadsheet software such that the started up spreadsheet software is not terminated;
accessing an information acquisition source to acquire information;
entering the acquired information in an information entry portion of a calculation sheet of the spreadsheet software, the calculation sheet being a calculation sheet in which a business logic is set for inter-cell computation on the calculation sheet;
acquiring a determination result on the calculation sheet when a determination result for the information entered in the information entry portion is shown by the business logic represented as inter-cell computation on the calculation sheet; and notifying a high-order system of the acquired determination result.

6. The control method according to claim 5, further comprising:
receiving an input of instruction information regarding setting of entered contents in a cell of the calculation sheet with respect to the calculation sheet of the spreadsheet software; and
setting entered contents in the cell on the calculation sheet based on the received instruction information.

7. The control method according to claim 5, wherein
the calculation sheet includes a first cell in which information indicating an information acquisition source is described, a second cell in which information acquired from the information acquisition source is entered, and a third cell in which a determination method is described based on a worksheet function using the information acquired from the information acquisition source and which indicates a determination result using a relative position or a background color,
accessing the information acquisition source comprises accessing the information acquisition source described in the first cell to acquire information,
entering the acquired information comprises entering the acquired information in the second cell, and
acquiring a determination result comprises acquiring the determination result indicated in the third cell.

8. The control method according to claim 7, wherein
the third cell includes, for each related item, a fourth cell in which a determination method performed in a plurality of steps is described based on a worksheet function to indicate a determination result of each related item, and a fifth cell in which a determination method for determining a final determination result based on the determination result indicated by each fourth cell is described based on a worksheet function and which indicates the final determination result, and
acquiring the determination result comprises acquiring the final determination result from the fifth cell.

9. A non-transitory computer readable medium storing one or more instructions for causing a computer to function as a control device to erform operations comprising:
confirming a start up of spreadsheet software;
when the spreadsheet software has not been started up, newly starting up the spreadsheet software, and, when the spreadsheet software has been started up, starting up second spreadsheet software after holding the started up spreadsheet software such that the started up spreadsheet software is not terminated;
accessing an information acquisition source to acquire information;
entering the acquired information in an information entry portion of a calculation sheet of the spreadsheet software, the calculation sheet being a calculation sheet in which a business logic is set for inter-cell computation on the calculation sheet;
acquiring a determination result on the calculation sheet when a determination result for the information entered in the information entry portion is shown by the business logic represented as inter-cell computation on the calculation sheet; and
notifying a high-order system of the acquired determination result.

10. The non-transitory computer readable medium according to claim 9, wherein the operations further comprise:
receiving an input of instruction information regarding setting of entered contents in a cell of the calculation sheet with respect to the calculation sheet of the spreadsheet software; and
setting entered contents in the cell on the calculation sheet based on the received instruction information.

11. The non-transitory computer readable medium according to claim 9, wherein
the calculation sheet includes a first cell in which information indicating an information acquisition source is described, a second cell in which information acquired from the information acquisition source is entered, and a third cell in which a determination method is described based on a worksheet function using the information acquired from the information acquisition source and which indicates a determination result using a relative position or a background color,
accessing the information acquisition source comprises accessing the information acquisition source described in the first cell to acquire information,
entering the acquired information comprises entering the acquired information in the second cell, and
acquiring a determination result comprises acquiring the determination result indicated in the third cell.

12. The non-transitory computer readable medium according to claim 11, wherein
the third cell includes, for each related item, a fourth cell in which a determination method performed in a plurality of steps is described based on a worksheet function to indicate a determination result of each related item, and a fifth cell in which a determination method for determining a final determination result based on the determination result indicated by each fourth cell is described based on a worksheet function and which indicates the final determination result, and
acquiring the determination result comprises acquiring the final determination result from the fifth cell.

* * * * *